April 20, 1926.
I. B. CRANDALL
1,581,334
VIBRATION DETECTING DEVICE
Filed June 24, 1919
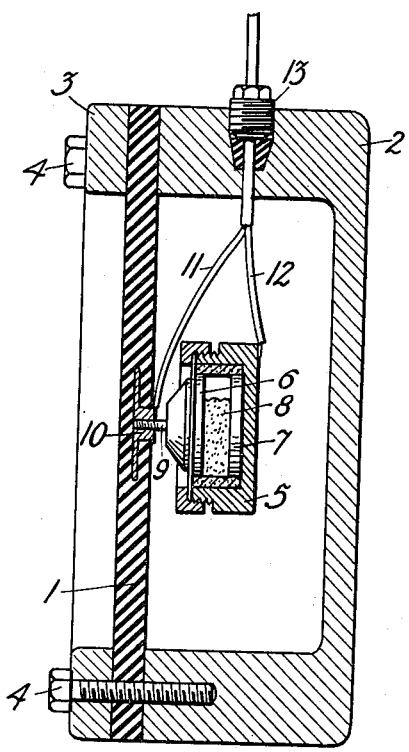
Inventor:
Irving B. Crandall
by J. E. Roberts Att'y Patented Apr. 20, 1926.

1,581,334

UNITED STATES PATENT OFFICE.

IRVING B. CRANDALL, OF EAST ORANGE, NEW JERSEY, ASSIGNOR TO WESTERN ELECTRIC COMPANY, INCORPORATED, OF NEW YORK, N. Y., A CORPORATION OF NEW YORK.

VIBRATION-DETECTING DEVICE.

Application filed June 24, 1919. Serial No. 306,472.

*To all whom it may concern:*

Be it known that I, IRVING B. CRANDALL, a citizen of the United States, residing at East Orange, in the county of Essex, State of New Jersey, have invented certain new and useful Improvements in Vibration-Detecting Devices, of which the following is a full, clear, concise, and exact description.

This invention relates to vibration detectors and particularly to a detector of this character which, while it may be used for a variety of purposes, is especially designed to detect under-water vibrations such as are produced by the ordinary submarine vessel.

In connection with devices of this character, especially when employed in the detection of submarine vessels, it is desirable to employ a device which is responsive to all vibratory effects within the useful range of frequencies without becoming unduly resonant in response to any such effects.

When the detecting device is placed directly in the water, it is desirable to maintain the sensitivity of the device independently of changes in pressure incident to varying the depth of its immersion in the water.

It is the object of the present invention to provide a device of this character which may be immersed in varying depths of water without affecting its normal sensitivity and which will receive all vibrations of useful frequencies with good efficiency.

In accordance with a feature of the invention, a current-varying device of the inertia type is supported from a soft diaphragm of energy absorbing material which is non-resonant at useful frequencies. More specifically, the inertia button is supported by a diaphragm of relatively soft rubber or similar material.

It has been found by experiment that, due to the yielding quality of the rubber, a diaphragm formed of such material retains its normal sensitivity substantially independent of the pressures which may be exerted against it.

The energy absorbing character of material of this nature, resulting from its high internal friction, imparts to the material an inherent damping property rendering it very desirable for use in the construction of diaphragms for detecting devices which may be subjected to numerous local disturbances.

Experiments have also proven that rubber or similar material is less resonant at all useful frequencies than various hard materials such as metals, which have been used for diaphragms, so that when a diaphragm of such material is employed, the quality of the transmission is impaired to a considerably lesser degree by a tendency to amplify the received vibrations which coincide with the fundamental rate of vibration of the diaphragm. Thus, with a diaphragm of such material, all vibrations within the useful range of frequencies are received with more nearly equal efficiency.

Furthermore, the self-sealing quality of the diaphragm of such material adds to its desirability for use in a device employed in the water.

The above mentioned and other features of the invention, not specifically mentioned, will clearly appear from the following specification and the annexed drawing, in which is shown a partial sectional view of a device embodying the invention.

In the embodiment illustrated in the drawing, a complete detecting device is provided which may be immersed in water and used in the detection of a submarine or other vessel located at a distant point and producing characteristic vibrations. A vibration responsive member or diaphram 1, preferably formed of some energy absorbing material such as comparatively soft rubber, is clamped over the open end of a casing 2, by means of a ring 3, in cooperation with machine screws 4—4 passing therethrough and engaging the metallic casing 2. Due to the self-sealing property of the soft rubber diaphragm, a water-tight joint is provided to prevent the entrance of water to the interior of the casing. An inertia button 5 of any usual type is provided, comprising front and back electrodes 6 and 7 respectively, between which, a mass of granulated carbon or other comminuted resistance-vary material 8 is placed and such elements are enclosed in a casing. The button 5 is supported from the diaphragm 1, by the threaded stud 9, engaging a bushing 10 embedded in the diaphragm. Leading-in conductors 11 and 12 pass through a waterproofing bushing 13 provided in the side wall of the casing, and are connected to the front and back electrodes 6 and 7 respectively. When the device is in use, the vibrations, propagated through the water, produce synchronous vibrations of the diaphragm 1 which are translated through the medium of the microphonic button 5 into electrical variations in a circuit which may be associated with the conductors 11 and 12 and which may include a telephone receiver for transforming such variations into audible effects for observation. As the device is submerged, the diaphragm 1 readily yields to the pressure exerted against it without materially impairing the quality or efficiency of the transmission of the received vibrations. Also, the energy absorbing character of the diaphragm prevents the transmission to the current-varying device of incidental shocks or other local disturbances which may be encountered in the use of the device.

What is claimed is:

1. A vibration detector comprising a diaphragm of soft rubber, means for clamping the periphery of such diaphragm, and a current varying device supported from the diaphragm.

2. A vibration detector comprising a diaphragm of elastic non-resonant energy absorbing material, means for clamping the periphery of such diaphragm, and a current varying device supported from such diaphragm.

3. A vibration detector comprising a diaphragm of a material having the inherent damping characteristics of soft rubber, means for clamping the periphery of such diaphragm, and a current varying device supported from such diaphragm.

4. A vibration detector comprising a current varying device and a diaphragm of elastic energy-absorbing material having the characteristics of soft rubber for supporting the current varying device, said diaphragm being adapted for operation when subjected to varying pressures, and the sensitivity of said device being independent of the pressure to which the diaphragm is subjected.

5. In the device above described, a watertight casing, an aperiodic disk impervious to liquid located to provide and maintain in said casing a chamber free from liquid, and a microphone located in said liquid-free chamber and mounted on said disk.

6. In a sound receiving device, the combination of an enclosed chamber having at least one wall composed of soft rubber and constructed to transmit sound vibrations, and a microphone in said chamber carried by said wall.

7. In a sound receiving device, the combination of a chamber adapted to be submerged in water and to exclude the water therefrom having at least one wall composed of soft rubber and constructed to transmit sound vibrations, and a microphone in said chamber carried by said wall.

In witness whereof, I hereunto subscribe my name this 17th day of June A. D., 1919.

IRVING B. CRANDALL.